United States Patent [19]

Bandlow et al.

[11] Patent Number: 5,038,723
[45] Date of Patent: Aug. 13, 1991

[54] SCREENING DEVICE FOR A HEAT EXCHANGER OF A VEHICLE

[75] Inventors: Reiner Bandlow, Köngen; Wolfgang Kleineberg, Calw, both of Fed. Rep. of Germany

[73] Assignee: Mercedes-Benz AG, Fed. Rep. of Germany

[21] Appl. No.: 584,792

[22] Filed: Sep. 19, 1990

[30] Foreign Application Priority Data

Oct. 5, 1989 [DE] Fed. Rep. of Germany ....... 3933199

[51] Int. Cl.$^5$ ............................................... F01P 7/02
[52] U.S. Cl. ..................................... 123/41.04; 165/99
[58] Field of Search ............... 123/41.04, 41.05, 41.06, 123/41.07; 165/98, 99; 180/68.1

[56] References Cited

U.S. PATENT DOCUMENTS 1,170,730  2/1916  Benjamin et al. ................. 123/41.04

FOREIGN PATENT DOCUMENTS 3631785  11/1987  Fed. Rep. of Germany .
3836374  1/1990  Fed. Rep. of Germany .

*Primary Examiner*—Noah P. Kamen
*Attorney, Agent, or Firm*—Evenson, Wands, Edwards, Lenahan & McKeown

[57] ABSTRACT

A screening device for a heat exchanger which is arranged in an air duct of a vehicle and the air exit area of which is covered partially by an air duct cross-section tapered downstream of the heat exchanger and partially by an air duct wall subjected to dynamic pressure. The screening device consists exclusively of a flap-type blind, the screening area of which extends only over the partial area of the heat exchanger lying opposite the tapered cross-section of the air duct and by the lateral terminating flap of which an overflow channel between the duct wall and the flap-type blind is also screened off.

5 Claims, 1 Drawing Sheet

SCREENING DEVICE FOR A HEAT EXCHANGER OF A VEHICLE

BACKGROUND AND SUMMARY OF THE INVENTION

The invention relates to a screening device for a heat exchanger of a vehicle.

German Patent 3,631,785 discloses a screening device for dividing an air duct into two subducts: one through which air flows and one through which water flows. With the screening device opened, cooling air can flow through the entire cross-section of the radiator. However, when the vehicle is operated on land, with the screening device completely closed, the flow of cooling air through the radiator is completely closed off. In this mode of operation, one of the subducts is blocked directly by a flap-type blind, which is arranged in front of the radiator, and abuts a partition wall. The flow through the second subduct, on the other hand, is blocked indirectly; that is, by a back pressure space bounded by the partition wall, a duct wall and a separate flap which screens off an overflow opening lying behind the radiator, between the partition wall and the duct wall.

The known division of the air duct is relatively expensive since the partition wall must pass straight through the radiator, and the additional flap requires its own drive and control. In addition, the overall arrangement of the screening device in the air duct requires a considerable amount of installation space, which is frequently unavailable.

Another, screening device of the generic type, which is arranged in a particularly compact air duct, is disclosed in German Offenlegungsschrift 3,836,374. This screening device consists of a single flap-type blind situated in a space-saving manner between a radiator and a fan. Since this flap-type blind completely covers the radiator, the flow of cooling air is completely blocked when the radiator blind is closed. In addition, in the open condition the flaps of the radiator blind, which lie opposite a fan cowl duct wall running obliquely towards the fan aperture, are oriented obliquely towards the fan aperture. As a result, the oblique flaps act as baffle surfaces and require only a small overall depth. However, because the duct wall runs a short distance behind the screening plane of the flap-type blind, the resistance of the radiator to through flow in the region of the oblique flaps is increased considerably. Despite the reduced overall depth of the oblique flaps, that heat-exchanger area of the radiator which is affected by them cannot be fully utilized, particularly during the flow of relative wind through it. If, on the other hand, the distance of the duct wall from the rear edges of the oblique flaps were increased, an undesired enlargement of the fan cowl would also result.

The object of the present invention is to provide a screening device of the generic type for a heat exchanger of a vehicle which is less expensive to construct, and at the same time is suitable for arrangement in a compact air duct.

This and other objects and advantages are achieved according to the invention, in which a flap type blind extends only to that portion of the air flow path adjacent the fan aperture, with a specially shaped lateral terminating flap which seals off air flow in the remainder of the air flow path. Since, according to the invention, all flaps belong to the screening device of the flap-type blind, a drive and a control are required only for the flap-type blind itself. In addition, because the flap-type blind must now only cover that region of the area of the heat exchanger through which air flows virtually in a straight line, only a minimum number of flaps is required.

For a common drive of all flaps of the flap-type blind, it is expedient if their rotational axes lie in a single plan. If the special flap forming the lateral termination of the flap-type blind is mounted on a rotational axis near its rear edge, the sealing wing of the adjacent flap can come to rest against the rear edge of the special flap, which is moved in the same direction but offset at an angle.

If, with the flap-type blind opened, the special flap lies obliquely to the inflow direction of the relative wind, it can have a rotating angle corresponding to that of the remaining flaps, a common drive thereby being further simplified. Moreover, optimum utilization of the construction space is possible if, with the flap-type blind in the open position, the leading edge of the special flap lies in the same plane with the leading edges of the remaining flaps. In this arrangement, the leading edges can extend almost as far as the exit are of the heat exchanger.

In order for the special flap to overlap with the adjacent flap (which corresponds to the remaining flaps), the special flap can be provided with an angled wing. The length of this wing, however, should be restricted to the dimension of the flap overlap since, with the flap-type blind opened, the leg protrudes into the overflow opening.

Because of its compact construction, the screening device according to the invention is highly suitable for arrangement as a radiator blind in cramped fan cowls of motor vehicles.

In addition, use on heat exchangers, such as those which are common in motor vehicles for heating or air conditioning, would however also be conceivable.

Other objects, advantages and novel features of the present invention will become apparent from the following detailed description of the invention when considered in conjunction with the accompanying drawings.

DETAILED DESCRIPTION OF THE DRAWINGS

Figure 1:
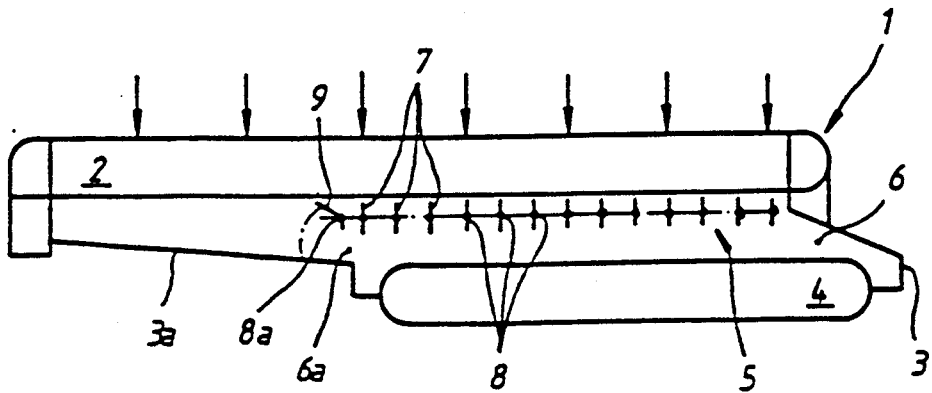
FIG. 1 shows an arrangement of a screening device in a schematic plan view.

Arranged behind a radiator grill at the front of a motor vehicle (not shown) is a radiator/fan system 1. The principal components of the radiator/fan system 1 are a vehicle radiator 2, in which cooling water circulates; a fan cowl 3, a fan 4 and a flap-type blind 5. The vehicle radiator 2 is arranged in a transverse plane of the engine compartment s that cooling air flows through it approximately at right angles. The inflowing relative wind striking the forward facing air inlet o said radiator is indicated in FIG. 4 by a plurality of arrows. Lying behind the vehicle radiator 2 is a fan cowl 3, which surround the air exit cross-section of the vehicle radiator 2 and guides the stream of cooling air to an air inlet aperture of fan 4. For this purpose, its boundary walls are connected to the periphery of a round fan shroud of the fan 4, the fan cowl 3 thus delimiting an air duct 6 closed all the way round. However, the air inlet aperture of the fan 4, lying parallel to the air exit area of the vehicle radiator 2 and opposite to it at a distance, covers only the right-hand half of the air exit area. Opposite the left-hand half of the air exit area of the vehicle radiator 2 is a duct wall 3a, which is subjected to a dynamic pressure during the flow of relative wind through the vehicle radiator 2. So that the outgoing air flow of the vehicle radiator 2 is deflected towards the air inlet aperture of the fan 4 with less resistance in this region, the duct wall 3a runs slightly obliquely towards the air inlet aperture of the fan 4, its distance from the vehicle radiator 2 progressively increasing in the direction of the deflected flow.

In order to prevent temporarily the flow of cooling air through the vehicle radiator 2 as a function of operating parameters of the cooling system, with minimum expenditure, the flap-type blind 5 is arranged in a parallel plane between the vehicle radiator 2 and the fan 4, completely covering a righthand portion of the air exit area of the vehicle radiator 2 and, as seen in the direction of the width of the vehicle radiator 2, ending when it reaches the duct wall 3a.

The flap-type blind 5 consists of a multiplicity of individual flaps 7 which are mounted in a known manner so as to rotate on their central longitudinal axes, and which are arranged at a distance from one another in a common plane. The plane in which the swivelling axes 8 are arranged corresponds to the screening plane of the flap-type blind 5 since. That is, when the flap-type blind is moved into a 5 closed position, the flaps 7 are rotated into this plane, and the mutually overlapping flaps thereby form a continuous wall. With the flap-type blind 5 opened, in contrast, the flaps 7 have been swivelled by an angle of somewhat less than 90°, after which they are aligned parallel to the inflow direction of the relative wind, as seen over their cross-section. In this illustrated open position of the flaps 7, the outgoing airflow of the vehicle radiator 2 can flow between them with little resistance. In addition, the forward-facing leading edges of the flaps 7 lie directly behind the exit area of the vehicle radiator 2.

The sealing of the closed flap-type blind 5 along its periphery is unproblematic at the top, at the bottom and on the right-hand side, since the edges of the flaps 7 and an end region near to the rear edge of the flap 7, which forms the right-hand termination of the flap-type blind 5, can overlap with a countersurface of the fan cowl 3. On the other hand, the screening off of an overflow channel 6a situated between the closed flap-type blind 5 and the duct wall 3a is more difficult. In order to close this overflow channel 6a when the flap-type blind 5 is moved to the closed position, the flap forming the left-hand termination of the flap-type blind 5 has a special design. In contrast to the remaining flaps 7, the special flap 9 is mounted so as to rotate not on its central longitudinal axis as are the others, but rather on a rotational axis 8a which is shifted in parallel towards the region near to its rear edge. Moreover, this rotational axis 8a is somewhat closer to the adjacent rotational axis 8 than the rotational axes 8 are from each other. Furthermore, with the flap-type blind 5 opened, the special flap 9 extends obliquely forwards from the rotational axis 8a, at an acute angle to the adjacent flap 7. Its outward-rotated position is such that its leading edge lies in the same plane as the leading edges of the remaining flaps 7.

In addition, the outward-rotated position of the special flap 9 is matched to the distance of the rotational axis 8a from the opposite duct wall 3a in such a way that, after rotation through an angle $\alpha$, its leading edge strikes against the duct wall 3a, so that the overflow channel 6a is screened off.

Figure 2:
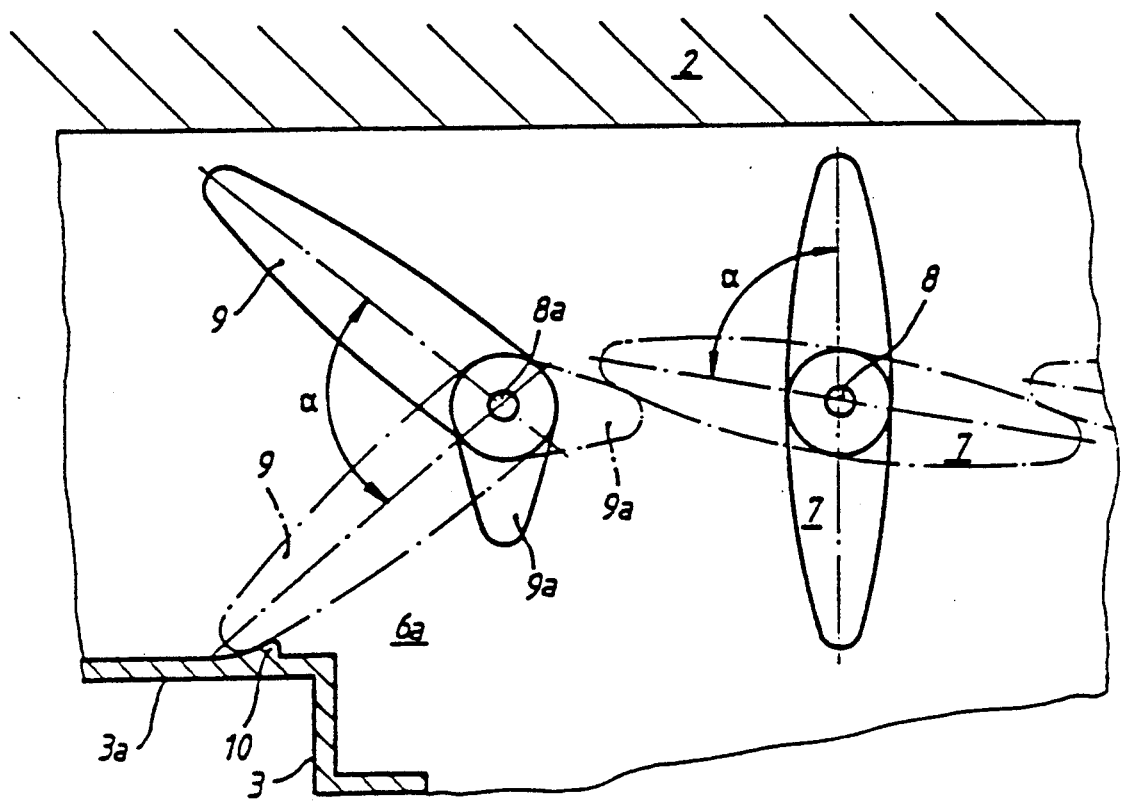
FIG. 2 shows a schematic representation of a special flap region of the screening device as an enlarged detail.

As can be seen in FIG. 2, this swivelling angle $\alpha$ corresponds exactly to the angle $\alpha$ between the open and closed positions of the remaining flaps, as indicated by broken lines. As a result, all flaps 9 and 7 can be rotated synchronously in the same direction in a technically simple manner. A simple mechanical driving device may, for example, comprise an axially driven connecting rod to which all flaps 9 and 7 are coupled via a crank lever. Driving devices of this kind are sufficiently well known as such, e.g. from German Patent 943,158, and are therefore not explained in detail.

In order to permit a planar overlap of the rear edge of the special flap 9 by the end region of the adjacent flap 7 which is on the inflow side, the special flap 9 does not end in a cylindrical bearing sleeve which surround the swivelling axis 8a, but has a projection in the form of a short wing 9a which protrudes beyond the swivelling axis 8a and, as seen in cross-section, is angled off from the longer wing of the special flap 9. The cross-section of the leg 9a is of tapered configuration in the end region on the leading-edge side in a manner corresponding to the cross-section of the remaining flaps 7. With the flap-type blind 5 opened, it also extends parallel to the longitudinal axis of the cross section of the remaining flaps 7. With the flap-type blind 5 closed, this results in a seal between the special flap 9 and the adjacent flap 7, the effectiveness of which is equal to that of the sealing between the flaps 7.

A similar planar overlap can also be provided between the duct wall 3a and the region of the longer wing of the special flap 9 for the purpose of improving the seal. A raised nose 10, which on its abutment side is shaped in a manner corresponding to the tapered curvature of the leading edge of the special flap 9, projects from the duct wall 3a.

As an alternative, it would however also be possible to replace the raised nose 10 by a depression in the duct wall 3a.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Screening device for a heat exchanger of a vehicle having an air duct surrounding an area of the heat exchanger through which air flows, said air duct having a duct wall, which substantially covers a partial area of the heat exchanger and by which the air duct is narrowed downstream of heat exchanger relative to a direction of air flow, said screening device comprising:

a flap type blind arranged in a transverse plane of said air duct, between said heat exchanger and said duct wall, so as to define an overflow opening between an end of said flap type blind and said duct wall;

said flap type blind comprising a plurality of flaps rotatable about longitudinal axes thereof, which axes are parallel to one another and to said duct wall, and lie in said transverse plane;

wherein only a portion of that area of the heat exchanger through which air flows is covered by the flaptype blind, said overflow opening between the end of the flap type blind and the duct wall being screened off by a terminal flap of the flap-type blind when the flap-type blind is in a closed position.

2. Screening device according to claim 1, wherein the terminal flap is mounted on a longitudinal axis near a rear edge thereof, and the remaining flaps of the flap-type blind are mounted along central longitudinal axes thereof.

3. Screening device according to claim 1, wherein all flaps-type blind are rotatable through a substantially identical angle of approximately ninety degrees, wherein with the flap-type blind in an open position, said terminal flap is oriented obliquely to the inflow direction of air, and wherein the remaining flaps are aligned parallel to the inflow direction of the air.

4. Screening device according to claim 3, wherein, with the flap-type blind in an open position, a leading edge of the terminal flap lies in the same plane with leading edges of the remaining flaps.

5. Screening device according to claim 3, wherein as seen in cross-section, the terminal flap is formed in an angle and has a short wing which protrudes on the side of the swivelling axis, extending parallel to the remaining flaps of the flap-type blind.

* * * * *